Figure 1:
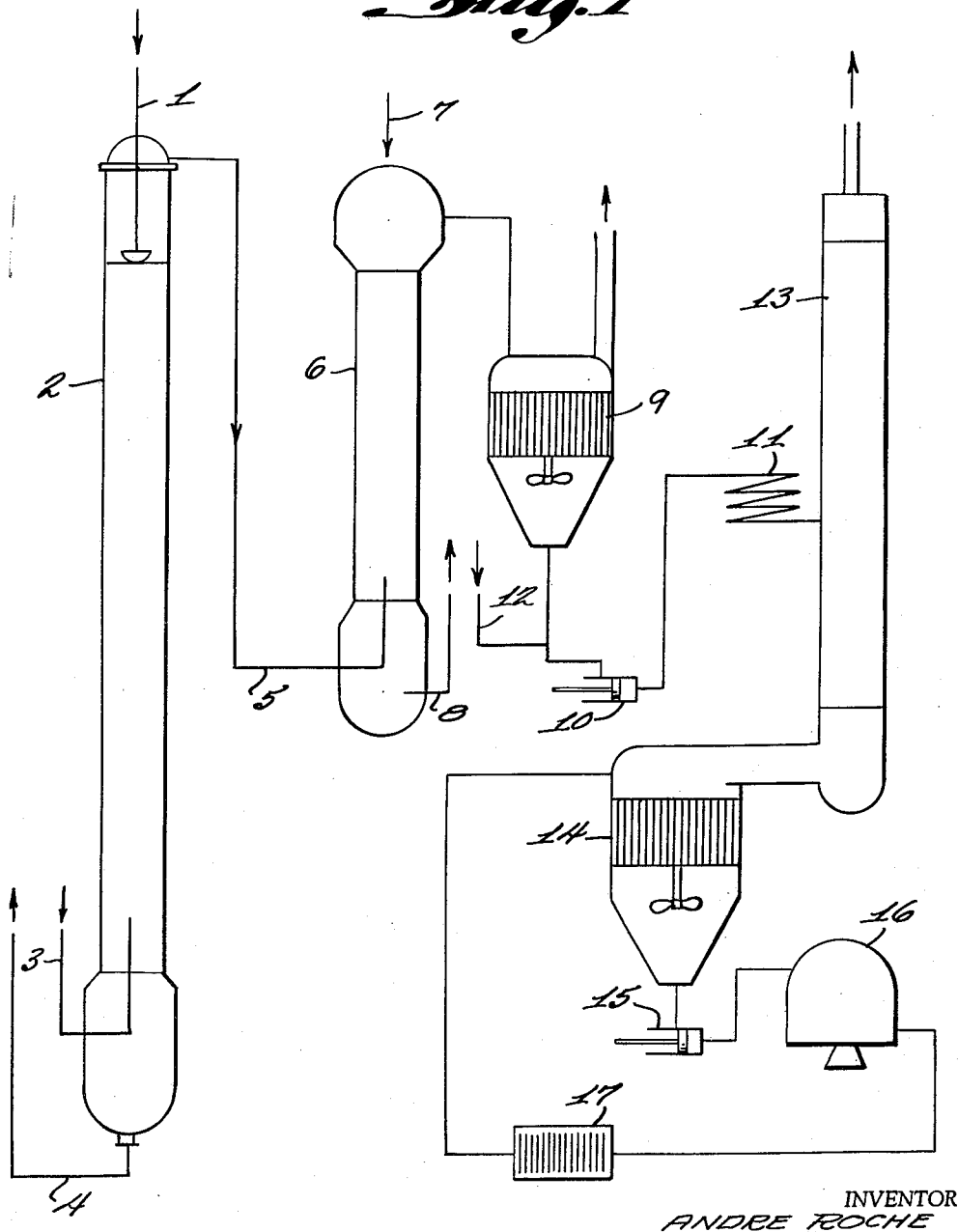

July 2, 1963

A. ROCHE ETAL 3,096,377

PROCESS FOR THE RECOVERY OF PENTAERYTHRITE

Filed May 15, 1959

2 Sheets-Sheet 1

INVENTORS
ANDRE ROCHE
PIERRE GRANCHER
JEAN GAJAC
ROBERT BECANNE

BY Irvin S. Thompson

ATTORNEY

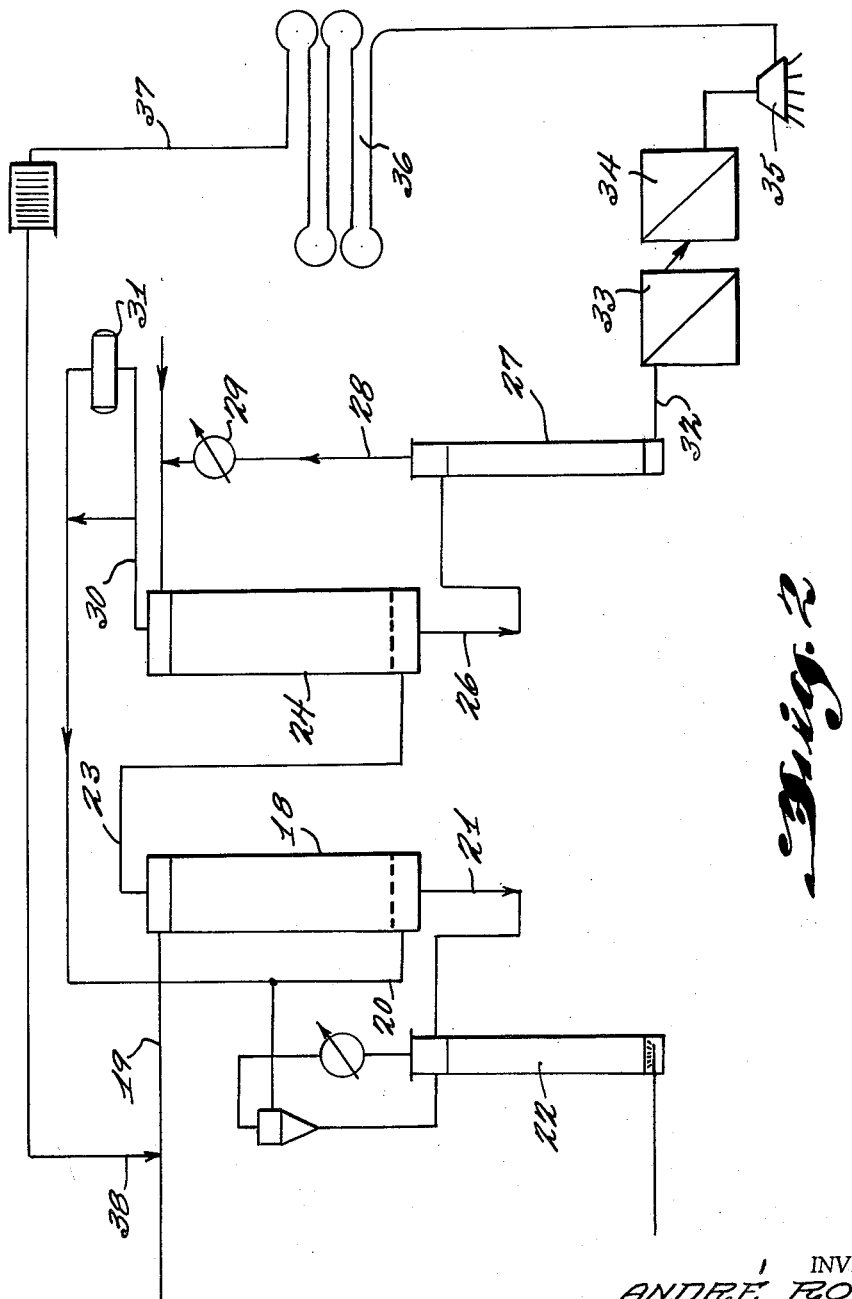

United States Patent Office 3,096,377
Patented July 2, 1963

3,096,377
PROCESS FOR THE RECOVERY OF
PENTAERYTHRITE
André Roche, Paris, Pierre Grancher and Jean Gajac, Toulouse, and Robert Becanne, Pinsaguel, France, assignors to the French State represented by the Minister of Armies (Powder Department), Paris, France
Filed May 15, 1959, Ser. No. 813,489
1 Claim. (Cl. 260—637)

It is a well-known fact that certain polyvalent alcohols, such as pentaerythrite and similar substances, such as pentaglycerine, trimethylolpropane, are obtained through the action of formaldehyde on aliphatic aldehydes and ketones.

Said method of production leads to the obtention of aqueous solutions containing the desired polyvalent alcohols the polymers of said polyvalent alcohols, such as polypentaerythrite, alkaline or alkaline earth formates, and products obtained through the secondary reactions due to the condensation of the original raw materials.

Various methods have been proposed for extracting the pentaerythrite from its mother liquor, but none allows a complete and selective recovery with an efficiency above 85%.

Now, our present invention has for its object:

To obtain an almost complete recovery of the polyvalent alcohol, such as pentaerythrite, and of its desired polymers;

To separate, if required, the polyvalent alcohol from its polymers;

To recover the formic acid from the formate contained in the mother liquid.

Our invention is based on the fact that we have remarked that when an aqueous solution of pentaerythrite which has been brought to a suitable pH is stirred at room temperature with certain aldehydes or ketones which are not miscible with water, the pentaerythrite or polyvalent alcohol passes out of the aqueous phase into the organic phase no longer as a biacetal as in the case of benzaldehyde:

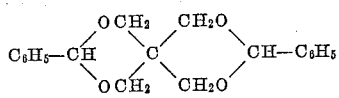

but as a product which is more readily hydrolyzed and which is presumed to be a hemiacetal.

To this end, our invention resorts to a well-known liquid-liquid extraction method, after the mother liquor of the polyvalent alcohol has been suitably acidified so as to be brought to a pH ranging between 0.1 and 3, said method consisting accordingly in treating the acidified liquor by an aldehyde or a ketone which is not soluble in water or by a mixture of a ketone or an aldehyde with a water-insoluble organic solvent so that the pentaerythrite is caused to enter the organic phase. Said acidifying operation having transferred the formic acid out of its salts, the formic acid thus released will be extracted together with the pentaerythrite.

Consequently, at the end of this first operative step, the pentaerythrite and the polypentaerythrite or the like polyvalent alcohols have all been transferred into the organic phase.

Said organic phase is then washed at room temperature by pure water or preferably by an alkaline aqueous solution, so as to provide for reextraction of the formic acid.

Said operation has for its advantage to provide also a reextraction of the secondary organic substances which may have been transferred into the organic phase during the preceding above-described extracting step.

The organic phase contains then only pentaerythrite and its polymers and it is subjected either:

To a further selective extraction by acidified water in a liquid-liquid extraction apparatus of a known type at a temperature ranging between 70 and 150° C., and even 200° C.

Or else to a treatment in a stream of steam.

In both cases, there is obtained an aqueous solution of pentaerythrite and of its polymers, which solution may be evaporated until dryness is reached, so as to leave a deposit constituted by a very white mixture of pentaerythrite and polypentaerythrite, leaving no ashes upon burning.

Obviously, it is possible to resort to a fractionate crystallization with a view to preparing, if required, an extremely pure pentaerythrite.

Said separation of the polypentaerythrites may also be controlled as follows: if, the organic solution of pentaerythrite being concentrated in vacuo, there are obtained, after cooling, crystals of diacetal out of a viscous oil; if the crystals and the oil are subjected separately after filtration to hydrolysis, we obtain respectively perfectly pure pentaerythrite and dipentaerythrite containing more than 80% of dipentaerythrite.

The solvent which is to serve for extraction may be constituted by benzoic or toluidic aldehyde, a methylated, halogenated or nitrated derivative of said aldehydes, furfuraldehyde, cyclohexanone, methyl or dimethyl cyclohexanone, acetophenone and the like.

The diluent solvent may be an ester, a primary or secondary alcohol, an aliphatic or cyclic aldehyde or ketone, the preferred solvent being constituted by cyclohexanone.

Our invention covers also the arrangement for executing in a continuous manner the purification of polyvalent alcohols in accordance with the above-disclosed method.

Further objects and features of our invention will appear in the reading of the following description, reference being made to the accompanying drawings illustrating by way of example, in a non-limiting sense, a preferred embodiment of such an arrangement.

Furthermore, various applications of our improved method will be disclosed also by way of a mere exemplification.

FIGS. 1 and 2 of the drawings illustrate respectively two embodiments of a plant according to our invention.

In FIG. 1, 1 designates the input pipe for the solution of mother liquor containing, say pentaerythrite to be purified. Said pipe opens into an extraction column 2 filled with Raschig rings and adapted to act as a pulsatory column. Into the lower end of the column is introduced at 3 the aldehyde or ketone adapted to produce reaction leading to the formation of a diacetal. The two liquids move in counter-current relationship inside the column and thus there is obtained a liquid-liquid extraction of the pentaerythrite with the dipentaerythrite and the formic acid.

The exhausted liquid passes out of the column 2 at 4 and is fed into means for recovering the dissolved aldehyde.

As to the organic solution, it is sent into the lower input end 5 of a further extraction column 6 which may also be of a pulsatory type. At the upper end of said column 6 there is introduced at 7 an alkaline solution, while an aqueous solution of alkaline formate is collected at 8 at the bottom of the column 6. This extraction of the formic acid may, as a matter of fact, be replaced by a distillation. The organic solution is then sent into a vaporizing vessel 9 inside which it is concentrated until almost pure diacetal is obtained. It is then delivered out of said vaporizing vessel 9 by a pump 10 and sent into a heat exchanger 11 where it is treated in the presence of the water incorporated with the solution through the pipe 12 at a raised pressure and at a temperature ranging between 70 and 200° C. during, say one to ten minutes, whereby the acetal is destroyed. The organic solution expands then inside the column 13 and is submitted to a stream of steam which carries away any acetone or aldehyde released through hydrolysis.

Pentaerythrite in the form of an aqueous solution sinks now inside the boiler incorporating a crystallizing dish 14 out of which it is removed as a slurry by the pump 15 to be drained beyond said pump into the boiler 16.

The mother liquor obtained through crystallization is then filtered on activated coal at 17 and is returned into the boiler 16.

In the modification illustrated in FIG. 2, 18 designates an extracting vessel such as a column which may be of the pulsatory type or otherwise or a battery of mixing and settling vessels or any other known arrangement for operating a liquid-liquid extraction while there is introduced into the upper end of said extracting vessel, through the pipe 19, the solution produced by the synthesis referred to, after acidification and removal of the formaldehyde, while the pipe 20 introduces into the lower end of the extracting means the aldehyde or ketone forming the solvent. The exhausted aqueous solution passes out of the bottom of the column 18 at 21 and enters then a solvent-recovering means 22 such as a distilling column, an extracting apparatus or the like known arrangement. The organic solution passing out of the column 18 is sent through the pipe 23 opening into the upper end of said column into a reextracting means 24 brought to a suitably selected temperature ranging between 50 and 100° C. into which there is introduced, through the pipe 25, pure or solvent-laden water. The aqueous phase containing the polyvalent alcohol passes out of the reextracting means 24 at 26 and is sent through a concentrating column 27 which releases the dissolved solvent. Said solvent escapes from the column 27 at 28 and may be returned into the water-feeding pipe 25 which recycles it into the reextracting means 24 or else it is removed at 29. Furthermore, the solvent escaping at 30 from the upper end of the reextracting means 24 is recycled at 20 into the lower end of the extracting column 18 after subjection, if required, to a purifying step at 31 as provided, for instance, by its progression inside a stream of steam. The aqueous solution passes out of the column 27 at the lower end thereof and thence through the pipe 32 into multiple stage concentrating means 33 and 34 and the polyvalent alcohol is finally separated out at 35. The mother liquor removed at 35 and containing some resins is sent into a super-heater 36 which transforms said resins into coke. The mother liquor freed of said resins may be recycled through the pipe 37 into the pipe 38 and thence into the pipe 19, so as to be subjected to a further extracting cycle.

We will now disclose five non-limiting embodiments of our improved method, resorting for instance to either of the plants which have just been described.

Example 1

1 liter of an aqueous solution at a concentration of 90 gr. per liter of pentaerythrite obtained through a synthesis procedure without any excess of formaldehyde is admixed with hydrochloric acid, so that its pH reaches a value of 0.5 and it is treated by an equal volume of cyclohexanone in a battery of four mixing and settling vats. The mother liquor being thus exhausted contains, after extraction, less than 1 gr. per liter of pentaerythrite.

After washing with a solution containing 2% by weight of sodium hydroxide, one-half of the extracted solution is treated by a stream of steam and the other half is subjected to a further extraction in a battery of four mixing and settling vats of a reduced size with water at a temperature of 98° C., the pH of which is equal to 3. After evaporation, there is obtained for the first half of the extracted solution, 44 gr. of white pentaerythrite leaving no ashes and the melting point of which is above 250° C.

The second half of the extracted solution provides similarly 42 gr. of pentaerythrite having the same characteristic data so that the extraction ratio is 97% in the first case and 93% in the second.

Example 2

A solution identical with that of Example 1 is treated under the same conditions by an equal volume of a mixture of one part of cyclohexanone with one part of cyclohexanol.

After alkaline washing and hydrolysis, there is obtained after a treatment in a stream of steam 43 gr. of pentaerythrite or else after a liquid-liquid extraction 41 gr., the pentaerythrite being in both cases perfectly white and having a melting point about 250° C.

Example 3

A solution similar to that described in the case of Example 1 is treated by an equal volume of furfuraldehyde. There is obtained after washing and treatment by a stream of steam 70 gr. of colored pentaerythrite.

Example 4

A solution similar to that used in the preceding example is treated by an equal volume of toluidic aldehyde after washing with sodium hydroxide and hydrolysis in a stream of steam; there is obtained a mass weighing 88 gr. of perfectly white pentaerythrite the melting point of which is above 252° C.

Example 5

A solution of pentaerythrite similar to that described in Example 1 is treated by an equal volume of cyclohexanone in conformity with the procedure disclosed in said Example 1.

The organic solution is first concentrated in vacuo and cooled, and there is then formed therein a deposit of diacetal crystals which are separated from the organic oily solution out of which said crystals precipitate.

The hydrolysis of the crystals allows obtaining 76 gr. of pentaerythrite the melting point of which is above 261° C. On the other hand, the hydrolysis of the remaining organic oily solution leads to the obtention of 8 gr. of a product having the following composition:

| | Percent by weight |
|---|---|
| Dipentaerythrite | 90 |
| Pentaerythrite | 10 |

What we claim is:

Process for the recovery of pentaerythrite in purified form from an aqueous liquid reaction mixture in which pentaerythrite has been formed by condensation of formaldehyde with an aliphatic aldehyde in the presence of an alkaline catalyst, which process consists of acidifying said reaction mixture with a mineral acid to a pH value ranging between 0.1 to 3 to release formic acid formed in said reaction mixture, adding to said acidified reaction mixture at a temperature ranging between 0 and 70° C. a substantially equal volume of an organic solvent selected from the group consisting of benzoic and toluidic aldehyde, furfuraldehyde, cyclohexanone, methyl and dimethyl cyclohexanone and acetophenone to extract the pentaerythrite from said acidified reaction mixture, separating the remaining acidified reaction mixture from said solvent containing the pentaerythrite, washing said solvent containing the pentaerythrite with a dilute alkaline solution, and subjecting said solvent containing the pentaerythrite to a stream of steam to thereby recover the pentaerythrite in purified form from said solvent.

References Cited in the file of this patent

UNITED STATES PATENTS 2,223,421    Hubacher et al. _____ Dec. 3, 1940

FOREIGN PATENTS 560,165    Great Britain _____ Mar. 23, 1944
473,278    Canada _____ May 1, 1951